United States Patent [19]

Chen

[11] 3,801,963

[45] Apr. 2, 1974

[54] METHOD AND APPARATUS FOR TRANSFERRING DATA FROM A VOLATILE DATA STORE UPON THE OCCURRENCE OF A POWER FAILURE IN A COMPUTER

[75] Inventor: Kun-Chao C. Chen, Plymouth, Mich.

[73] Assignee: Burroughs Corporation, Detroit, Mich.

[22] Filed: Sept. 28, 1972

[21] Appl. No.: 292,968

[52] U.S. Cl...... 340/172.5, 235/153 R, 340/174.1 R
[51] Int. Cl........................... G06f 11/00, G06f 13/04
[58] Field of Search.................. 340/172.5, 174.1 R; 179/100.2 E; 235/153 A, 153 R, 151.11

[56] References Cited

UNITED STATES PATENTS

| | | | |
|---|---|---|---|
| 3,188,452 | 6/1965 | Asbury | 340/172.5 X |
| 3,636,331 | 1/1972 | Amrehn | 340/172.5 X |
| 3,147,462 | 9/1964 | Levinson et al. | 340/174.1 R |
| 3,623,014 | 11/1971 | Doelz | 340/172.5 |
| R27,485 | 9/1972 | McGilvray et al. | 340/172.5 |
| 3,321,747 | 5/1967 | Adamson | 340/172.5 |
| 3,533,082 | 10/1970 | Schnabel et al. | 340/172.5 |
| 3,688,263 | 8/1972 | Balogh, Jr. et al. | 340/172.5 |
| 3,691,357 | 9/1972 | McIntosh | 235/151.11 |

*Primary Examiner*—Gareth D. Shaw
*Assistant Examiner*—Melvin B. Chapnick
*Attorney, Agent, or Firm*—Edwin W. Uren; Paul W. Fish; Charles S. Hall

[57] ABSTRACT

A method and apparatus for transferring data from or between computers in a data processing system, such method utilizing a circuit controlled tape cartridge containing a magnetic tape. One specific application of the disclosed data transfer technique arises upon failure of a computer having volatile data storage, such failure resulting either from internal malfunctioning or from a power failure. Upon the occurrence of these types of failures in computers having volatile memories, the contents of the failing computer's memory can only be preserved by immediate transfer to some extraneous form in which it may be stored and later reapplied, as by transferring memory content to a tape cartridge for subsequent reading into the memory of a back-up computer or for re-entry into the memory of the failing computer upon correction of the malfunction or allevation of the power failure. It is to this particular data preserving need of volatile memory computers that the method and apparatus of the present invention is particularly directed.

17 Claims, 4 Drawing Figures

METHOD AND APPARATUS FOR TRANSFERRING DATA FROM A VOLATILE DATA STORE UPON THE OCCURRENCE OF A POWER FAILURE IN A COMPUTER

BACKGROUND OF THE INVENTION

1. Field of the Invention

The present invention relates to data processing or computer systems in general, and, more particularly, to a method and apparatus for preserving the data stored in the volatile memory of a computer upon the occurrence of a power failure, and for transferring data from the memory of a failing computer to the memory of a back-up computer whenever a malfunction other than a power failure occurs.

2. Description of the Prior Art

Prior art techniques have commonly made use of magnetic tapes and tape cartridges for transferring data between computers, and for recording memory content for subsequent use in the same or a different computer. Such techniques, however, have generally failed to satisfy the particular needs that arise in the case of a power failure occurring in a volatile memory computer, whereupon memory content is generally lost before such extraneous recording can be achieved.

Another prior art technique has a particular utility when magnetic drums are utilized as a means of storing data, such technique generally providing a second magnetic drum which is called into play when the speed of a first drum decreases below a predetermined rate, thereby evidencing a malfunction within the computer. This technique provides for the transfer of the data contained in the first drum to the second drum, thereby providing protection against isolated defects in the drum control system, although proving ineffective for preserving the data contained in a volatile memory upon the occurrence of an over-all power failure.

SUMMARY OF THE INVENTION

It is accordingly an object of the present invention to provide a new and improved method and apparatus for preserving the contents of a volatile data storage device in a computer system, in the event of an over-all power failure.

It is a further object of the present invention to provide a new and improved method and apparatus for conveniently transferring stored data as between discrete computer systems.

It is still a further object of the present invention to provide a method and apparatus for automatically preserving the contents of a volatile memory in a computer upon the occurrence of a power failure, without human intervention.

An important aspect of the present invention is the provision in a computer system of a standby magnetic storage means, a read-write head and a motor operatively associated with such storage means, an auxiliary power source coupled to the memory of the computer and to said motor, and circuit means including a power loss detector for activating the auxiliary power source and the motor to operably activate the magnetic storage means relative to the read-write head whenever a power failure occurs, activation of the standby storage means being effective to transfer the content of computer memory to the magnetic storage means, and activation of the auxiliary power source serving additionally to supply current to the memory of the computer to thereby prevent loss of content during the period of such transfer.

BRIEF DESCRIPTION OF THE DRAWING

Other objects, aspects and advantages of the invention will be more clearly understood from the following description when read in conjunction with the accompanying drawing, in which.

DESCRIPTION OF THE PREFERRED EMBODIMENT

Figures 1, 2, 3, 4:
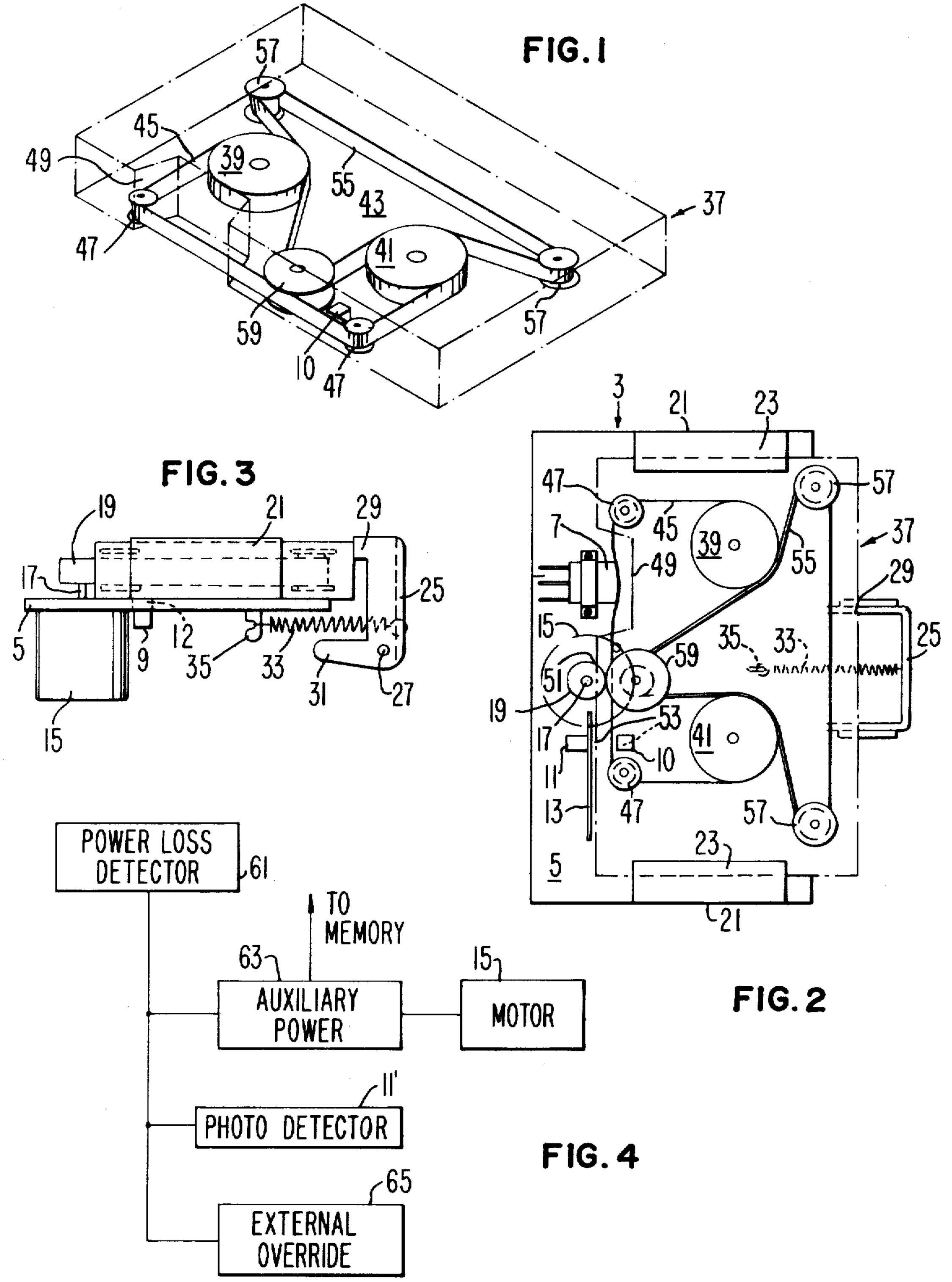
FIG. 1 is a perspective view of a removably attachable tape cartridge that is utilized in the method and apparatus of the present invention.
FIG. 2 is a plan view of the tape cartridge of FIG. 1 disposed in mounted relationship relative to a receiving platform and in cooperating relationship relative to a read-write head and a motor-driven drive roller.
FIG. 3 is a side elevation of the tape cartridge and structure of FIG. 2.
FIG. 4 is a block diagram of circuitry effective for accommodating the control requirements of the invention.

As briefly suggested under "Summary of the Invention," the present invention resides in the provision in a volatile memory computer of: a removably mounted magnetic tape cartridge; mounting means for accommodating the tape cartridge; a read-write head and a motor associated with the mounting means, said read-write head being coupled to the volatile memory of the computer; an auxiliary power source coupled to the volatile memory and to the motor; and a power loss detector effective for actuating the auxiliary power source to thereby supply D.C. current to the volatile memory and to the motor such as to transferably activate the magnetic tape in cooperation with the read-write head and to maintain the data in the volatile memory until it is transferred to the magnetic tape.

The tape cartridge mounting means to be provided in adapting a computer to the subject invention can best be described with reference to FIG. 2 wherein the mounting means, generally designated at 3, is comprised of a cartridge receiving area or platform 5 which, on its uppermost side, serves to support a read-write head 7, a photo-detector 11, and a light shield 13, the read-write head 7 being coupled to the volatile memory of the computer. The underside of the platform 5, as best shown in FIG. 3, serves to support a light source 9 aligned with a cut-out 12 formed in the platform, and an electric motor 15, the light source 9 and photo-detector 11 being activated and controlled in any well-known manner not forming a part of the present invention. The electric motor 15 is provided with a motor shaft 17 extending through an aperture formed in the platform 5, a drive roller 19 being fixed to the uppermost extremity of the shaft 17 and in cooperating relationship with a hereinafter described drive pulley of the mounted magnetic tape cartridge. The cartridge receiving platform 5 is also provided with a pair of fixed upturned guides 21 disposed on opposing ends thereof, each upturned guide 21 being provided with an overturned surface 23 effective for guidably retaining a mounted magnetic tape cartridge in operable relationship on the platform 5. A biased cartridge retaining clamp 25 is pivotally supported on a shaft 27 in blocking relationship relative to the trailing edge of the mounted tape cartridge, the shaft 27 being supported either by structure integrally formed with the platform 5 or by any suitable extraneous structure. The retaining clamp 25 is generally U-shaped in configuration and provided with a pair of cartridge abutting projections 29 and a pair of limit-stop projections 31, the projections 31 limiting against the underside of the platform 5 when the clamp 25 is manually pivoted to install or remove a tape cartridge. The cartridge retaining clamp 25 is biased in a cartridge retaining counterclockwise direction on the shaft 27 (as viewed in FIG. 3) by means of a spring 33 connected at one end to the clamp 25 and at the other end to a spring anchor 35 fixed to the underside of the platform 5.

The magnetic tape cartridge generally designated at 37 in FIGS. 1 and 2 is shown in mounted relationship relative to the receiving platform 5 in FIG. 2, and in displaced relationship relative to the platform 5 in FIG. 1. The cartridge 37 is standard magnetic tape cartridge, available in the market place, and comprised of a flangeless supply spool 39 and a flangeless take-up spool 41, both of which spools are rotatably supported by pins secured to a base plate 43 of the cartridge. A magnetic tape 45 is end anchored to the supply spool 39 and to the take-up spool 41 and is guided in its movement therebetween by means of a pair of guide pulleys 47, such guide pulleys being arranged to direct the tape in a path of travel from the supply spool 39 to the take-up spool 41 through a recess or cut-out 49 formed in the cartridge 37 for accomodating the read-write head 7, such path of travel accordingly being so configured as to cooperably move the tape 45 past the read-write head 7. In addition to the recess or cut-out 49, the cartridge 37 is provided with a second cut-out 51 for accommodating the drive roller 19, and with a reflector 10 associated with a pair of windows 53, the windows 53 and reflector 10 serving to angularly direct a beam of light from the light source 9 to the photo-detector 11. The cartridge 37 is also provided with an elastic drive band 55 operably supported by a pair of band rollers 57 and a drive pulley 59, the configuration being such as to dispose portions of the band 55 in driving contact with the periphery of the tape 45 wound around the supply spool 39 and take-up spool 41. It is to be noted that the magnetic tape 45, in its movement between the supply spool 39 and the take-up spool 41, as guided by the pair of guide pulleys 47, passes freely between the flange members of the drive pulley 59, and that these flange members extend outwardly of the tape 45 to establish a driving contact with the drive roller 19 when the cartridge 37 is properly installed on the mounting platform 5. It is also to be noted that a clockwise rotation of the drive pulley 59, as hereinafter described in connection with the operation of the invention, is effective to rotate the band 55 in a clockwise direction and to thereby frictionally rotate the supply spool 39 and take-up spool 41 in a counterclockwise direction, such counterclockwise rotation of the spools being effective to transport the tape 45 in a counterclockwise direction from the supply spool 39 to the take-up spool 41. It is further to be noted that the counterclockwise rotation of the drive pulley 59 would be effective to move the drive band 55 in a counterclockwise direction and to thereby frictionally rotate the supply spool 39 and the take-up spool 41 in a clockwise direction, such clockwise movement of the spools being effective to transport the tape in a clockwise direction from the take-up spool 41 to the supply spool 39. The cartridge 37 may also be provided with pivotal flaps effective for covering the cut-outs 49 and 51 when the cartridge is removed from the mounting platform 5, to thereby safeguard the tape 45 against dust accumulations when the cartridge is not in use.

The magnetic tape cartridge 37 may readily be installed on the receiving or mounting platform 5 by manually pivoting the cartridge retainer clamp 25 in a clockwise direction (as viewed in FIG. 3), and by inserting the cartridge underneath the overturned ends 23 of the upturned guides 21, such installation being completed when the flange members of the drive pulley 59 are brought into drivable contact with the periphery of the drive roller 19, and when the window 53 in the cartridge base 43 is aligned with the cut-out 12 of the platform 5 and with the light source 9. Following installation of the cartridge 37, retaining clamp 25 is manually released to thereby provide a yieldable driving contact between the flange members of the drive pulley 59 and the drive roller 19, such contact being established by the spring 33 acting on the clamp 25 and the abutting projections 29 thereof.

With a magnetic tape cartridge 37 installed on the receiving platform 5, hereinafter described circuitry means is effective, upon the occurrence of a power failure, to rotate the motor 15 and the drive roller 19 in a counterclockwise direction (as viewed in FIG. 2), such rotation being effective to rim-drive the drive pulley 59 in a clockwise direction and to move the drive band 55 in a clockwise direction about the band rollers 57, the band 55 frictionally rotating the supply spool 39 and the take-up spool 41 in a counterclockwise direction. Counterclockwise rotation of the spools 39 and 41 is effective to feed the tape 45 in a counterclockwise direction past the read-write head 7 and to thereby record the data stored in the volatile memory of the computer on the magnetic tape 45. Well-known circuitry may be utilized in connection with the light source 9 and the photo-detector 11 to terminate the transfer of data from the memory to the tape whenever the passage of light from the light source 9 to the photo-detector 11 is permitted by a broken tape, and a transparent section of the tape adjacent the end thereof anchored to the supply spool 39 may be utilized to terminate operation of the motor 15 when all of the tape has been unwound from the supply spool and maximum winding on the take-up spool 41 has been achieved.

FIG. 4 illustrates, in block diagram form, circuitry that may be utilized for detecting a loss of power, and for activating the motor 15 and magnetic tape cartridge 37 whenever a loss of power occurs, such circuitry at the same time supplying D.C. current to the volatile memory of the computer to prevent erasure of the stored data prior to the time it is transferred to the tape. Known circuitry, such as that disclosed in U. S. Pat. No. 3,321,747, may be used as the power loss detector 61 illustrated in FIG. 4, and any well known auxiliary power source such as a constantly charging D.C. battery may be used as the auxiliary power source 63, it being noted that the power loss detector 61 is electrically connected to the auxiliary power source 63, and that the auxiliary power source is electrically connected to both the volatile memory of the computer and to the electric motor 15. A photo-detector circuit designated at 11' in FIG. 4 may also be coupled to the power loss detector 61 and to the auxiliary power source 63, to deactivate the motor 15 whenever the passage of light from the light source 9 to the photo-detector 11 is permitted. An external override 65 in the form of a manually actuatable member may also be connected to the auxiliary power source 63 to thereby permit voluntary activation of the motor 15 and the magnetic tape cartridge 37 in the absence of a power failure and for a purpose hereinafter described.

OPERATION OF THE PREFERRED EMBODIMENT

Operation of the inventive apparatus will first be described in connection with the automatic preservation and transfer of data from a volatile memory store of a computer system, upon the occurrence of a power failure. Normal operation of a computer having the inventive automatic transfer apparatus incorporated therein would require that a magnetic tape cartridge 37 be maintained in installed relationship relative to the receiving platform 5, with the tape 45 thereof fully wound onto the supply spool 39, and with the drive pulley 59 of the cartridge held in driven contact with the drive roller 19 of the motor by means of the spring 33 and the abutting projections 29 of the clamp 25. With a cartridge 37 so disposed, upon the occurrence of a power failure, the power loss detector 61 would activate the auxiliary power source 63 to supply D.C. current to the volatile memory of the computer, and to activate the motor 15 to thereby operatively advance the tape 45 past the read-write head 7. Movement of the tape 45 past the read-write head 7 effectively serves to transfer the data stored in the volatile memory to the magnetic tape 45. Upon completion of the transfer of data from the memory to the magnetic tape, deactuation of the motor 15 and the tape cartridge 37 may be accomplished under the program control of the computer, by activation of the external override 65 by the attending operator, or by the photo-detector 11' in the event that the tape is permitted to completely transfer from the supply spool to the take-up spool such as to bring the transparent portion of the tape into light-passing alignment with a beam of light reflected by the reflector 10 to the photo-detector 11. Once the data has been transferred to the magnetic tape 45 of a magnetic tape cartridge 37, re-entry of the data back into the volatile memory of the computer, upon alleviation of the power failure, would require that the tape 45 of the cartridge 37 be rewound from the take-up spool 41 to the supply spool 39. This rewinding of the data-containing tape 45 on the supply spool 39 may be accomplished in any convenient way as by the reverse rotation of the motor 15 and drive roller 19 under the program control of the computer in response to manipulation of the override 65, or by a separate rewind device upon removal of the cartridge 37 from the receiving platform 5. When the data-containing tape 45 has been rewound onto the supply spool 39, with the cartridge 37 properly installed on the platform 5, the motor 15 and the drive roller 19 may then be reactivated, as by means of the override 65, the magnetic tape 45 being accordingly advanced past the read-write head 7 to writably transfer the data back into the volatile memory. It is to be noted that once the data has been re-entered into the volatile memory of the computer, rewinding of the tape 45 onto the supply spool 39 would again be required, as by program control in response to manipulation of the override 65, or by a separate rewind device, whereupon normal operation of the computer could be resumed.

In addition to the advantage of automatic data transfer upon the occurrence of a power failure, computer systems equipped with the inventive data transfer apparatus would additionally lend themselves to the voluntary transfer of data between the memories of separate computers, such as when a malfunction other than a power failure occurs in a given computer. When such malfunction occurs, the data stored in the memory of the malfunctioning computer may be readily transferred to the memory of a back-up computer. To accomplish this voluntary transfer of data, the external override 65 of the malfunctioning computer would be manipulated and the auxiliary power source 63 and motor 15 thereof activated, the data stored in the memory of the malfunctioning computer being according readably transferred to the magnetic tape 45 of the cartridge 37 that is installed on the malfunctioning computer's receiving platform 5. Upon completion of the readable transfer of the data to the magnetic tape 45, the tape cartridge 37 would be removed from the platform 5 of the malfunctioning computer, and the tape 45 rewound either before or after installation of the cartridge 37 on the platform 5 of the back-up computer, the external override 65 being manipulated to writably transfer the data to the memory of the back-up computer, as was fully described in a preceding section in connection with the re-entry of data into the volatile memory of a computer following the alleviation of a power failure.

While a preferred embodiment of the data transferring apparatus has been shown and described in considerable detail, it will be understood that various modifications and alterations therein may be made without departing from the true spirit and scope of the invention.

What is claimed is:

1. Apparatus for use in conjunction with a computer having a volatile data store and effective for preserving stored data upon the occurrence of a power failure, said apparatus comprising:

a. an auxiliary power source associated with said computer, b. a read-write head coupled to said volatile data store, c. removably mounted auxiliary data storage means cooperably disposed relative to said read-write head, said auxiliary data storage means comprising a magnetic tape cartridge equipped with a magnetic tape transferable between a supply spool and a take-up spool thereof, d. a motor cooperably disposed relative to said auxiliary data storage means and to said auxiliary power source, and e. circuit means coupled to said auxiliary power source, to said volatile data source, and to said motor and effective upon the occurrence of a power failure in said computer to preserve the data stored in said volatile data store and to activate said magnetic tape of said auxiliary data storage means relative to said read-write head such that said stored data is preservably transferred to said magnetic tape cartridge comprising said auxiliary data storage means for subsequent re-entry into said volatile data store of said computer upon the alleviation of said power failure.

2. The apparatus defined in claim 1 wherein said auxiliary power source is a constantly charging D.C. battery.

3. The apparatus defined in claim 2 wherein said motor is provided with a motor shaft and a drive roller fixed to the outermost extremity thereof.

4. The apparatus defined in claim 3 wherein said removably mounted data storage means additionally comprises a drive pulley forming a part of said magnetic tape cartridge and effective for transferring said magnetic tape as between said supply spool and said take-up spool thereof.

5. The apparatus defined in claim 4 wherein the removable mounting of said auxiliary data storage means is effectuated by means of a receiving platform associated with said computer, said receiving platform serving to support and to establish a predetermined position for said read-write head and for said motor and said drive roller thereof.

6. The apparatus defined in claim 4 wherein said magnetic tape cartridge is provided with a predetermined path of travel of said magnetic tape between said supply spool and said take-up spool, a first portion of said path of travel traversing a first cut-out formed in said tape cartridge to accommodate said read-write head and a second portion of said path of travel traversing a second cut-out formed in said tape cartridge to accommodate said drive roller of said motor in the proximity of said drive pulley, said second portion of said path of travel lying between a pair of flanges of said drive pulley adjacent the periphery thereof disposed in driven contact with said drive roller.

7. The apparatus defined in claim 5 wherein said receiving platform supporting and establishing said predetermined position of said read-write head and said motor and drive roller comprises:

a. a pair of oppositely disposed upturned guides having a pair of overturned ends fixed thereto, said guides being effective for guidably receiving said magnetic tape cartridge onto said receiving platform, b. a biased cartridge retaining clamp effective for abuttably and yieldably retaining said cartridge in operable relationship on said receiving platform such that said drive pulley thereof is disposed in driven contact with said drive roller of said motor shaft, said clamp being manually displaceable to permit the removal and insertable installation of said tape cartridge, and c. a light source and a photo-detector associated with said circuit means and with said computer and effective for detecting a break in said magnetic tape and the complete transfer of said tape from said supply spool to said take-up spool, said light source and said photo-detector being associated also with a reflector forming a part of said magnetic tape cartridge and effective for angularly directing a beam of light from said light source to said photo-detector upon the occurrence of a break in said tape or said complete transfer of said tape from said supply spool to said take-up spool.

8. The apparatus defined in claim 4 wherein said circuit means includes a power loss detector effective for sensing a loss of power in said computer and for activating said auxiliary power source upon said sensing, said activation of said auxiliary power source being effective to feed D.C. power to said volatile data store of said computer and to activate said motor to thereby transfer said magnetic tape from said supply spool to said take-up spool past said read-write head and to thereby preservably transfer said data stored in said volatile data store to said magnetic tape of said cartridge.

9. Apparatus for transferring data as between discrete and non-interfaced computer systems each having a data store, said apparatus comprising:

a. removably mounted auxiliary data storage means individually associated with each of said computer systems, each of said auxiliary data storage means comprising a magnetic tape cartridge equipped with a magnetic tape transferable between a supply spool and a take-up spool thereof, b. means associated with each of said computer systems and effective for readably transferring data from said data store thereof to said magnetic tape of said individually associated auxiliary data storage means, and for writably transferring data from a said magnetic tape to its said data store, c. means associated with each of said computer systems and effective for activating said transferring means thereof whereby said data stored in its said data store is readably transferred to said magnetic tape cartridge of said individually associated auxiliary data storage means, and said data stored in a said magnetic tape cartridge is writably transferred to its said data store, and d. means for arranging said data stored on a said magnetic tape cartridge of a said auxiliary data storage means as readably transferred from the data store of one of said discrete and non-interfaced computer systems, such that said data may be writably transferred to the data store of another of said computer systems upon the mounting of said magnetic tape cartridge thereon.

10. The apparatus defined in claim 9 wherein each of said removably mounted auxiliary data storage means additionally comprises a drive pulley forming a part of said magnetic tape cartridge and effective for transferring said magnetic tape as between said supply spool and said take-up spool thereof.

11. The apparatus defined in claim 10 wherein the removable mounting of said auxiliary data storage means is effectuated by means of a receiving platform associated with each of said computer systems.

12. The apparatus defined in claim 11 wherein said data transferring means comprises a read-write head associated with each of said computer systems and coupled to said data store thereof, said read-write head being supported by said receiving platform of said auxiliary data storage means.

13. The apparatus defined in claim 12 wherein said activating means associated with each of said computer systems comprises:

a. an auxiliary power source, b. a motor coupled to said auxiliary power source and comprising a motor shaft and a drive roller fixed thereto, and c. circuit means coupled to said auxiliary power source and to said motor, said motor and drive roller thereof being supported by said receiving platform of said auxiliary data storage means.

14. The apparatus defined in claim 13 wherein said circuit means includes a manually actuatable external override effective for activating said auxiliary power source and said motor such that said magnetic tape is transferred from said supply spool to said take-up spool past said read-write head and to thereby readably transfer the data stored in said data store to said magnetic tape of said auxiliary data storage means, or to writably transfer data stored on said magnetic tape to said data store of one of said computer systems.

15. The apparatus defined in claim 13 wherein said data arranging means comprises a receiving platform and an actuatable motor disassociated from any of said discrete computer systems and effective for transferring the magnetic tape of a magnetic tape cartridge from its said take-up spool to its said supply spool whereby by mounting said magnetic tape cartridge on said receiving platform of one of said computers said data stored on said tape may be writably transferred to the data store thereof.

16. In a computer having a volatile data store, the method of preserving the contents of said data store upon the occurrence of a power failure, comprising the steps of:

a. sensing said power failure by means of a power loss detector and associated circuitry forming a part of said computer, b. activating an auxiliary power source coupled to said power loss detector and to said data store to supply D.C. power to said data store and to activate a motor upon sensing a said power failure, and c. transferring, by means of said activated motor, a magnetic tape contained in a magnetic tape cartridge removably mounted on a supporting platform of said computer from a supply spool to a take-up spool past a read-write head coupled to said data store to thereby record said contents of said data store on said magnetic tape, said recorded contents being readably transferable from said magnetic tape by means of said read-write head for subsequent re-writing in said data store of said computer by manually activating said circuitry and said motor to again transfer said tape from said supply spool to said take-up spool after having first rewound said tape from said take-up spool to said supply spool.

17. In a family of discrete and non-interfaced computer systems each having a data store, the method of transferring the data from the data store of a first of said computer systems to the data store of a second of said computer systems, said method comprising the steps of:

a. manually activating an auxiliary power source of said first computer system to thereby activate an auxiliary data storage means removably mounted on said first computer system, b. readably transferring the data stored in the data store of said first computer system to a magnetic tape cartridge forming a part of said auxiliary data storage means removably mounted on said first computer system, said transfer being accomplished by the movement of a magnetic tape of said cartridge from a supply spool to a take-up spool thereof past a read-write head of said first computer system, c. removing said magnetic tape cartridge from said first computer system and rewinding said magnetic tape from said take-up spool to said supply spool, d. installing said rewound magnetic tape cartridge on said second computer system, d. manually activating an auxiliary power source of said second computer system to thereby activate said installed rewound magnetic tape cartridge, and f. writably transferring the data stored on said magnetic tape of said magnetic tape cartridge, said transfer being accomplished by the movement of said magnetic tape from said supply spool to said take-up spool past a read-write head of said second computer system.

* * * * *